US008867918B2

(12) United States Patent
Nakamura

(10) Patent No.: US 8,867,918 B2
(45) Date of Patent: Oct. 21, 2014

(54) REMOTE CONTROLLER

(75) Inventor: Tetsuya Nakamura, Ibaraki (JP)

(73) Assignee: Sony Corporation (JP)

( * ) Notice: Subject to any disclaimer, the term of this patent is extended or adjusted under 35 U.S.C. 154(b) by 955 days.

(21) Appl. No.: 12/456,912

(22) Filed: Jun. 24, 2009

(65) Prior Publication Data

US 2010/0008673 A1 Jan. 14, 2010

(30) Foreign Application Priority Data

Jun. 25, 2008 (JP) ................................ P2008-165693

(51) Int. Cl.
*H04B 10/00* (2013.01)
*G08C 17/02* (2006.01)
*G08C 23/04* (2006.01)

(52) U.S. Cl.
CPC ................ *G08C 17/02* (2013.01); *G08C 23/04* (2013.01)
USPC ............................ 398/115; 398/106; 398/111

(58) Field of Classification Search
None
See application file for complete search history.

(56) References Cited

U.S. PATENT DOCUMENTS

| | | | | |
|---|---|---|---|---|
| 4,904,993 | A | 2/1990 | Sato | |
| 5,500,691 | A * | 3/1996 | Martin et al. | 348/734 |
| 2001/0045819 | A1* | 11/2001 | Harris et al. | 323/371 |
| 2006/0063569 | A1* | 3/2006 | Jacobs et al. | 455/575.1 |
| 2006/0146956 | A1* | 7/2006 | Kim et al. | 375/297 |
| 2009/0245804 | A1* | 10/2009 | Garner et al. | 398/106 |

FOREIGN PATENT DOCUMENTS

| | | | |
|---|---|---|---|
| JP | 62186537 | U | 11/1987 |
| JP | 06284480 | A | 10/1994 |
| JP | 10336773 | A | 12/1998 |
| JP | 11284577 | A | 10/1999 |
| JP | 2000-232683 | | 8/2000 |
| JP | 2002-110369 | A | 4/2002 |
| JP | 2002112353 | A | 4/2002 |
| JP | 2003304412 | A | 10/2003 |
| JP | 2007043701 | A | 2/2007 |
| JP | 2007181178 | A | 7/2007 |

OTHER PUBLICATIONS

Office Action from Japanese Application No. 2008-165693, dated May 17, 2011.
Office Action from Japanese Application No. 2008-165693, dated Apr. 20, 2010.

* cited by examiner

*Primary Examiner* — Darren E Wolf
(74) *Attorney, Agent, or Firm* — Lerner, David, Littenberg, Krumholz & Mentlik, LLP

(57) ABSTRACT

A remote controller includes: an operation unit including plural operation keys; a radio communication unit that performs bidirectional communication with a controlled apparatus; an infrared communication unit that performs unidirectional communication with the controlled apparatus; and a control unit that is input with an operation signal from the operation unit and controls the radio communication unit and the infrared communication unit, wherein the control unit includes a measuring unit that measures power supply voltage, and the control unit controls the radio communication unit to transmit a control signal to the controlled apparatus when the power supply voltage is equal to or higher than a predetermined value and controls the infrared communication unit to transmit the control signal to the controlled apparatus when the power supply voltage is lower than the predetermined value.

8 Claims, 8 Drawing Sheets

10

REMOTE CONTROLLER

CROSS-REFERENCE TO RELATED APPLICATION

The present application claims priority from Japanese Patent Application No. JP 2008-165693 filed in the Japanese Patent Office on Jun. 25, 2008, the entire content of which is incorporated herein by reference.

BACKGROUND OF THE INVENTION

1. Field of the Invention

The present invention relates to a remote controller that controls a controlled apparatus, and, more particularly to a remote controller that automatically switches a communication system according to a situation.

2. Description of the Related Art

In the past, an infrared light receiving unit is provided in a controlled apparatus such as a television receiver and an infrared light emitting unit is provided in a remote controller. Remote control for the controlled apparatus is performed by operating the infrared light emitting unit while pointing the infrared light emitting unit toward the infrared light receiving unit. Such infrared communication (hereinafter referred to as IR (Infrared) communication as appropriate) is less easily interfered with other communication. On the other hand, the infrared light receiving unit may not be able to receive a control signal when there is an obstacle.

Therefore, there are currently an increasing number of electronic apparatuses having a radio communication (hereinafter referred to as RF (Radio Frequency) communication as appropriate) instead of the IR communication function. Unlike the IR communication, since the RF communication does not have directivity, it is possible to transmit a remote operation signal irrespective of presence or absence of an obstacle and the direction of a communication unit. Therefore, it is possible to improve operability for a user by, for example, providing RF communication units in the controlled apparatus and the remote controller.

Further, as disclosed in JP-A-2002-110369, a controlled apparatus and a remote controller have both an IR communication function and an RF communication function to switch and use IR communication and RF communication.

In JP-A-2002-110369, the remote controller can operate plural lighting apparatuses. When the plural lighting apparatuses are operated at a time, the remote controller is held in a holder, whereby a control signal is transmitted by an RF signal having wide directivity. When a specific lighting apparatus is operated, the remote controller is removed from the holder, whereby a control signal is transmitted by an IR signal.

SUMMARY OF THE INVENTION

However, the RF communication is relatively easily interfered with other communication or electromagnetic waves or the like emitted from other electronic apparatuses. Concerning battery power supply voltage, it is difficult to perform the RF communication at high power supply voltage compared with that of the IR communication. As a result, it is difficult to effectively use a battery capacity.

Therefore, there is a demand for a remote controller with which a user can comfortably perform remote control for an electronic apparatus using both the IR communication and the RF communication. Currently, the IR communication function is also mounted on an electronic apparatus having the RF communication function to allow the user to perform remote control with both the RF communication and the IR communication. Therefore, for example, some electronic apparatus has both a remote controller for RF communication and a remote controller for IR communication as accessories. However, the number of remote controllers increases. Further, since the user needs to properly use the remote controllers according to a communication system, convenience for the user is not high.

As disclosed in JP-A-2002-110369, the remote controller having both the RF communication function and the IR communication function is also put to practical use. However, when such a remote controller is used for the control of a television receiver and an external AV apparatus, a communication system is fixed according to an electronic apparatuses to be controlled. For example, the RF communication is used for the television receiver and the IR communication is used for the external AV apparatus.

For example, in the case of a remote controller that can operate both the television receiver and the external AV apparatus, an operated apparatus selection key and the like are provided. When a user selects an operated apparatus, a communication system suitable for the operated apparatus is selected. When such a remote controller is used, for example, it is difficult to perform remote control for the television receiver if a problem occurs in the RF communication. Therefore, regardless of the fact that transmission and reception of control signals by plural communication systems with different characteristics are possible in both the remote controller and the electronic apparatus, the configuration is not made full use of.

Therefore, it is desirable to provide a remote controller that allows a user to comfortably control an electronic apparatus by automatically switch a communication system for a control signal making use of characteristics of the IR communication and the RF communication.

According to an embodiment of the present invention, there is provided a remote controller including: an operation unit including plural operation keys; a radio communication unit that performs bidirectional communication with a controlled apparatus; an infrared communication unit that performs unidirectional communication with the controlled apparatus; and a control unit that is input with an operation signal from the operation unit and controls the radio communication unit and the infrared communication unit. The control unit includes a measuring unit that measures power supply voltage. The control unit controls the radio communication unit to transmit a control signal to the controlled apparatus when the power supply voltage is equal to or higher than a predetermined value and controls the infrared communication unit to transmit the control signal to the controlled apparatus when the power supply voltage is lower than the predetermined value.

In the remote controller according to the embodiment, the control unit may control the infrared communication unit to transmit the control signal to the controlled apparatus when the control unit determines that it is difficult to perform remote control via the radio communication unit even if the power supply voltage is equal to or higher than the predetermined value.

According to another embodiment of the present invention, there is provided a remote controller including: an operation unit including plural operation keys; a radio communication unit that performs bidirectional communication with a controlled apparatus; an infrared communication unit that performs unidirectional communication with the controlled apparatus; and a control unit that is input with an operation signal from the operation unit and controls the radio communication unit and the infrared communication unit. The control unit controls the radio communication unit to transmit a control signal corresponding to the operation signal to the controlled apparatus, determines whether an acknowledgement signal for the control signal is received from the controlled apparatus, and, when the control unit determines that the acknowledgment signal is not received, controls the infrared communication unit to transmit the control signal corresponding to the operation signal to the controlled apparatus.

In the remote controller according to the embodiment, the control unit may control the radio communication unit to transmit the control signal corresponding to the operation signal to the controlled apparatus again when the acknowledgment signal is not received and thereafter control the infrared communication unit to transmit the control signal to the controlled apparatus when the acknowledgment signal is not received.

According to still another embodiment of the present invention, there is provided a remote controller including: an operation unit including plural operation keys; a radio communication unit that performs bidirectional communication with a controlled apparatus; an infrared communication unit that performs unidirectional communication with the controlled apparatus; and a control unit that is input with an operation signal from the operation unit and controls the radio communication unit and the infrared communication unit. The control unit controls the radio communication unit or the infrared communication unit to transmit a control signal corresponding to the operation signal to the controlled apparatus and, when the same operation key of the operation unit is continuously operated in a short time, controls the radio communication unit or the infrared communication unit to transmit the control signal corresponding to the operation signal to the controlled apparatus according to a different communication system.

In the remote controller according to the embodiment, the control unit can control the radio communication unit or the infrared communication unit to transmit the control signal corresponding to the operation signal to the controlled apparatus according to a different communication system when the same operation key is operated a number of times equal to or larger than a predetermined number of times in a first predetermined time. In this case, it is preferable that the control unit controls the radio communication unit or the infrared communication unit to transmit the control signal according to the different communication system when the same operation key is operated in a second predetermined time after the elapse of the first predetermined time.

The control unit may control the radio communication unit or the infrared communication unit to transmit the control signal to the controlled apparatus according to the different communication system when the same operation key is operated a number of times equal to or larger than a predetermined number of times in a predetermined operation interval.

In the remote controller according to the embodiment, when the same operation key of the operation unit is continuously operated in a short time, the control unit switches an infrared communication system for transmitting the control signal via the infrared communication unit to a radio communication system for transmitting the control signal via the radio communication system. Alternatively, the control unit switches the radio communication system to the infrared communication system.

According to the embodiments, the controlled apparatus can be remotely controlled by both the radio communication and the infrared communication. It is possible to automatically switch a communication system according to power supply voltage of the remote controller or a communication state of a remote control signal.

According to the embodiments, since the radio communication and the infrared communication can be automatically switched according to a state of use, the remote controller does not need operation by a user and has high convenience.

DESCRIPTION OF THE PREFERRED EMBODIMENTS

Embodiments of the present invention are explained below with reference to the accompanying drawings.

(1) First Embodiment

In a first embodiment of the present invention, the control of a controlled apparatus is performed by RF communication when power supply voltage of a remote controller is equal to or higher than a predetermined value. When the power supply voltage falls below the predetermined value, the RF communication is automatically switched to IR communication to perform the control of the controlled apparatus.

Figure 1:
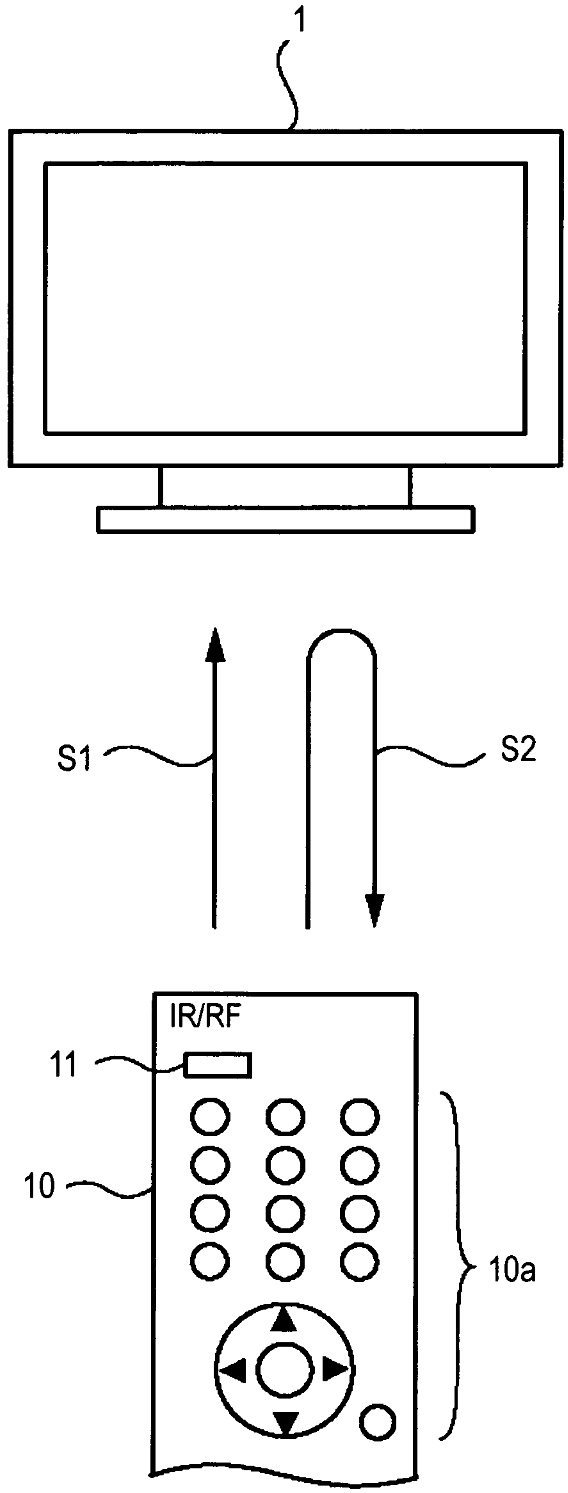
FIG. 1 is a schematic diagram of a configuration example of a remote controller according to a first embodiment of the present invention.

The first embodiment is explained below with reference to FIG. 1. A remote controller 10 controls a television receiver 1 as a controlled apparatus and includes an operation unit 10*a* including plural operation keys. The operation unit 10*a* includes operation keys for controlling the television receiver 1. The remote controller 10 shown in the figure is schematic. More detailed configuration of the remote controller 10 is explained later.

The remote controller 10 according to the first embodiment can remotely control the television receiver 1 with both RF communication and IR communication. When the remote controller 10 performs the remote control with the RF communication, as indicated by S1, after the remote controller 10 transmits a remote control signal, the television receiver 1 returns an acknowledgment signal (hereinafter referred to as acknowledgement as appropriate). When the remote controller 10 performs the remote control with the IR communication, as indicated by S2, unidirectional communication is performed.

Figure 2:
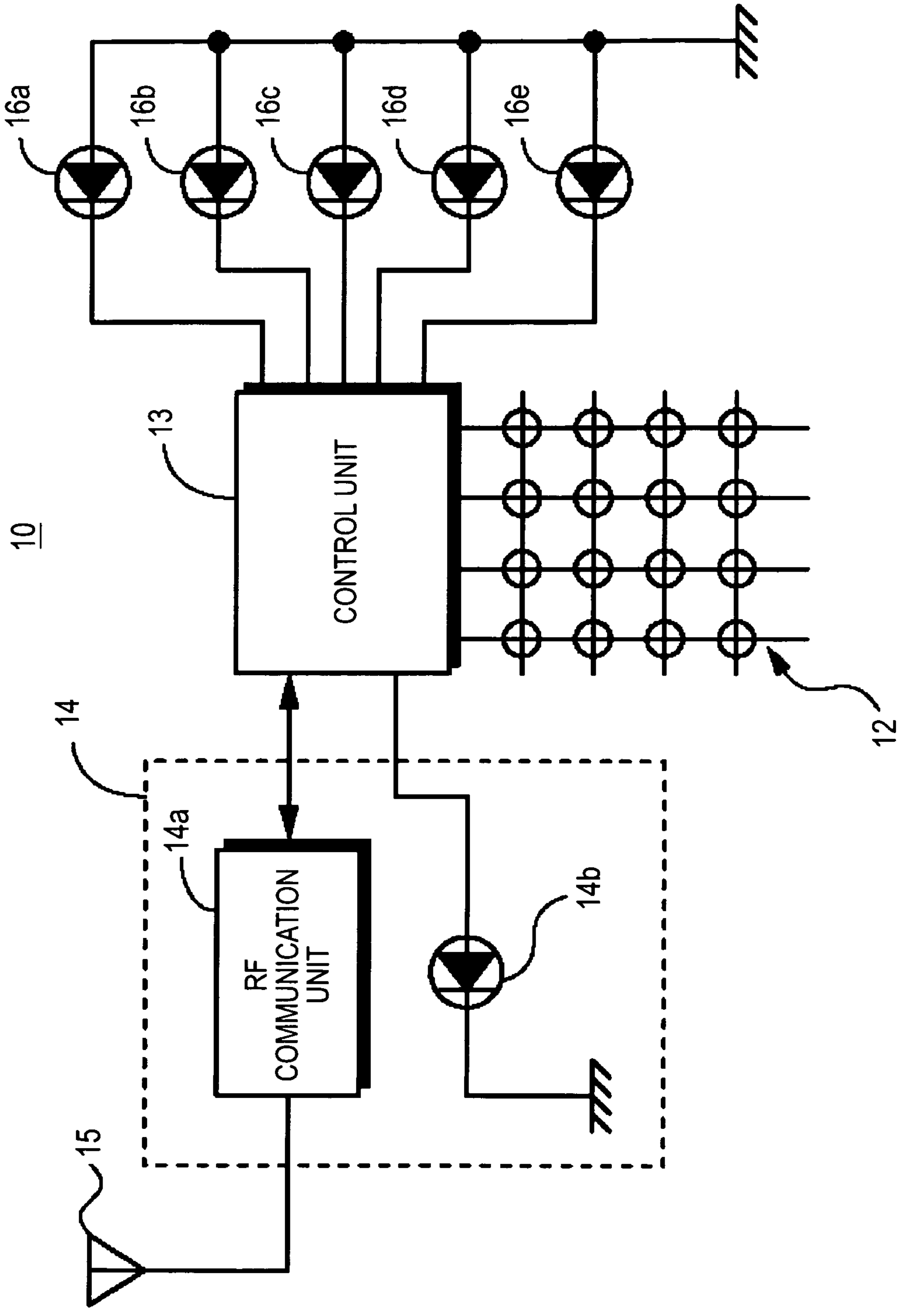
FIG. 2 is a block diagram of a configuration example of a main part of the remote controller.

A configuration example of a main part of the remote controller 10 is shown in FIG. 2. The remote controller 10 includes a key matrix 12, a control unit 13, a communication unit 14 including an RF communication unit 14*a* and an LED (Light Emitting Diode) 14*b* as an IR communication unit, and LEDs 16*a* to 16*e* that light the entire remote controller 10. The key matrix 12 detects which operation key is pressed in the operation unit 10*a* included in the remote controller 10 and supplies an operation signal indicating a detection result to the control unit 13. As operation keys, a power supply key, a ten key, a mute key, a volume adjustment key, a channel key, and a cursor four-direction key, and the like are provided. All the operation keys provided in the remote controller 10 are included in the key matrix 12.

The control unit 13 is a microcomputer (hereinafter referred to as MPU as appropriate) including a CPU (Central Processing Unit), a ROM (Read Only Memory), a RAM (Random Access Memory), and a memory, which are not shown in the figure. The control unit 13 controls the units of the remote controller 10 according to a computer program stored in the ROM in advance using the RAM as a work memory in executing the computer program. The memory is a nonvolatile memory such as an EEPROM (Electrically Erasable and Programmable ROM). Operation commands corresponding to the operation keys of the operation unit 10*a*, setting information of the remote controller 10, and the like are stored in the memory. The control unit 13 reads out an operation command corresponding to an address of a detected operation key from the memory and supplies the operation command to the RF communication unit 14*a*. When the control unit 13 detects that any one of the operation keys is operated, the control unit 13 turns on the LEDs 16*a* to 16*e*.

The RF communication unit 14*a* transmits a control signal to the television receiver 1 via an antenna 15 by radio according to a predetermined protocol. The RF communication unit 14*a* transmits various data such as an operation command, which is supplied from the control unit 13, to the television receiver 1.

The infrared communication unit 14*b* transmits an infrared ray to the television receiver 1 according to turn-on and turn-off of an infrared light emitting unit. The infrared communication unit 14*b* transmits various data such as an operation command, which is supplied from the control unit 13, to the television receiver 1.

The LEDs 16*a* to 16*e* are disposed, for example, on a circuit board provided in a lower part of an operation key sheet on which the plural operation keys are integrally provided in the remote controller 10. The operation key sheet is made of a material having light transmission properties. The operation keys of the remote controller 10 emit light when light irradiated from the LEDs 16*a* to 16*e* is transmitted through the operation key sheet. The section of the operation keys on the operation key sheet is exposed to the outside from a case of the remote controller 10 and can be depressed.

The LEDs 16*a* to 16*e* are turned on according to an operation command supplied from the control unit 13. The LEDs 16*a* to 16*e* are controlled to be turned off when set time elapses after the start of lighting. In FIG. 2, five LEDs 16*a* to 16*e* are provided as LEDs for lighting the operation keys. However, the number of LEDs is not limited to this. An arbitrary number of LEDs can be used.

Figure 3:
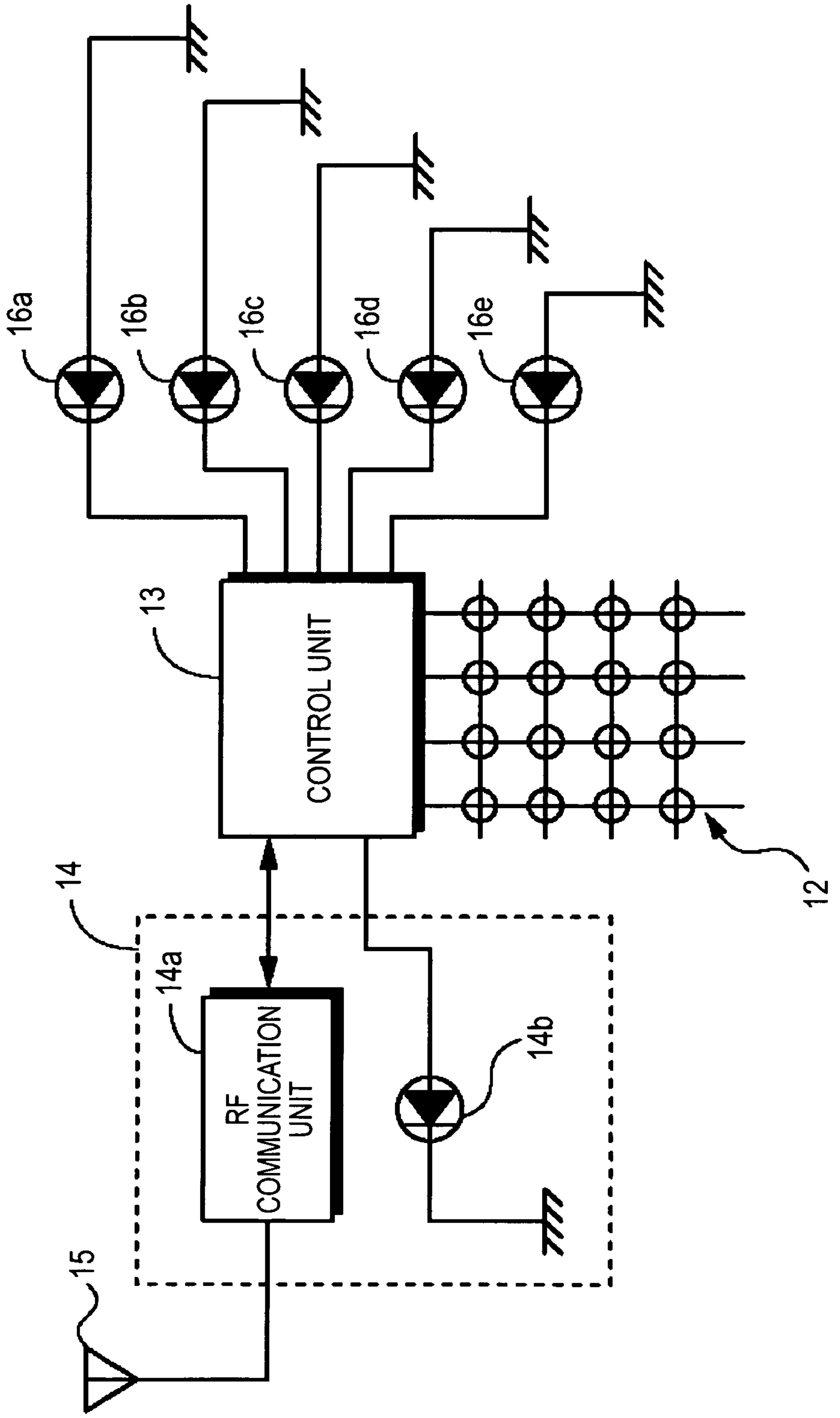
FIG. 3 is a block diagram of another configuration example of the main part of the remote controller.

As shown in FIG. 3, the LEDs 16*a* to 16*e* may be individually turned on. For example, the LED 16*a* is allocated to a ten key section and the LED 16*b* is allocated to a volume adjustment key section. When channel selection is performed by the ten key, only the LED 16*a* can be turned on. When adjustment of volume is performed, only the LED 16*b* can be turned on. Consumption of a battery can be suppressed by separately turning on the LEDs in this way. It goes without saying that plural LEDs may be arranged in the ten key section and the volume adjustment key section. LEDs that are individually turned on may be provided in operation key sections other than the ten key and the volume adjustment key.

Further, for example, the LEDs 16*a* to 16*e* may be divided into two groups having different developed colors to perform, according to a communication system set at that point, control to switch an LED to be turned on. A lighting unit 11 that indicates a set communication system may be provided. In this case, two LEDs may be provided in a section corresponding to the lighting unit 11 to perform control to turn on, for example, blue light during the RF communication and red light during the IR communication. Consequently, a user can consciously point the communication unit 14 toward the television receiver 1 during the IR communication. In the first embodiment, the RF communication is switched to the IR communication when battery voltage falls below a predetermined value. Therefore, the user can recognize that a battery capacity falls when the red light is turned on.

Figures 4A, 4B, 4C, 4D, 4E:
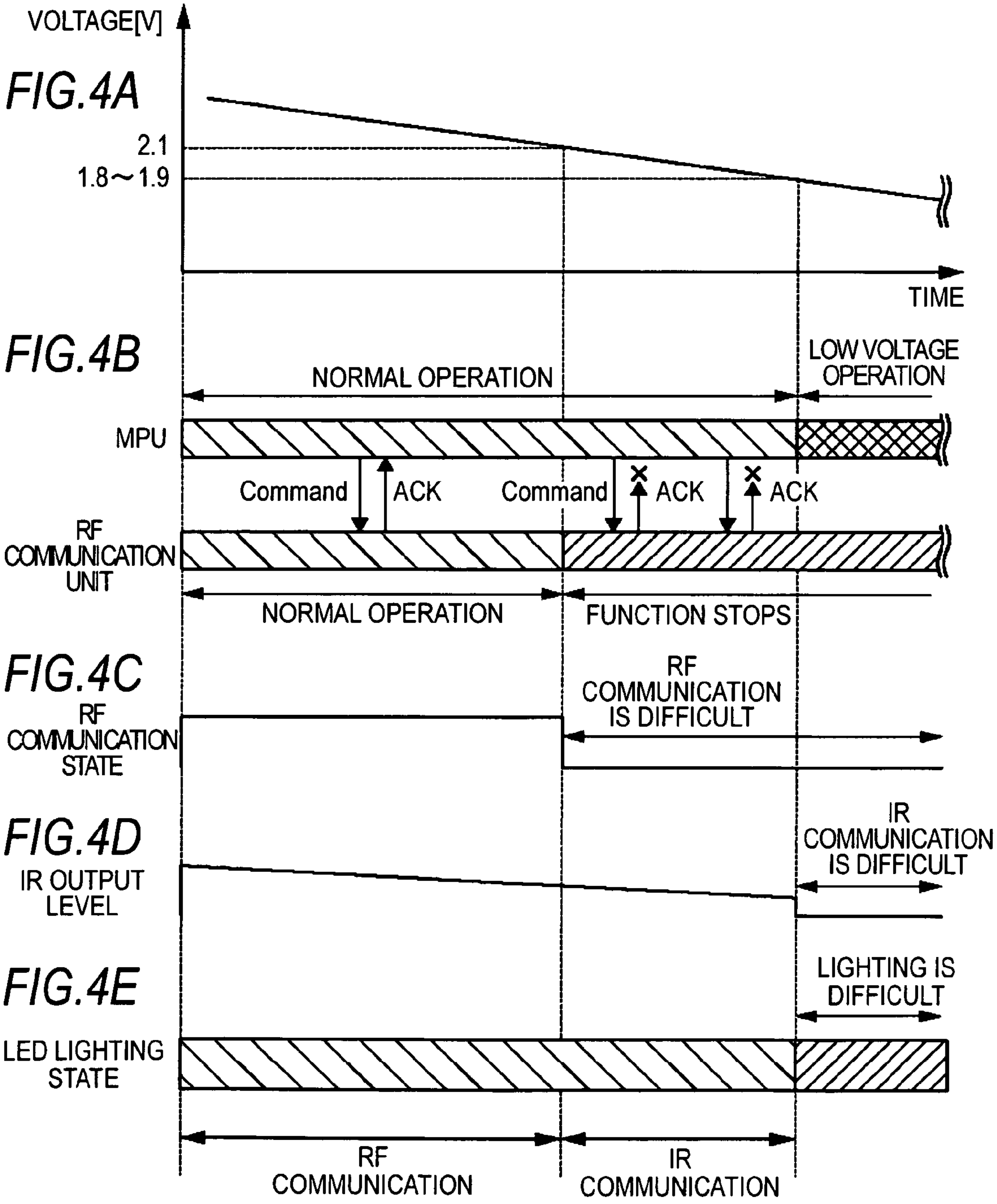
FIGS. 4A to 4E are schematic diagrams of an example of a relation between a voltage change and a communication state of the remote controller in the first embodiment.

FIGS. 4A to 4E are diagrams of a relation between a change in power supply voltage and a communication state of the remote controller 10. The power supply voltage of the remote controller 10 is shown in FIG. 4A. A state of communication between the MPU provided in the control unit 13 and an RF communication unit 23*a* of the remote controller 10 is shown in FIG. 4B.

A communication state of the RF communication due to a voltage change in the remote controller 10 is shown in FIG. 4C. An output level of the IR communication due to the voltage change in the remote controller 10 is shown in FIG. 4D. A lighting state of an LED that lights an operation key is shown in FIG. 4E. In the first embodiment, power supply voltage at which the operation of the remote controller 10 is performed is set to 3.6 V to 1.8 V. Operation voltage of the remote controller 10 is changed according to components in use and the like and is not limited to the voltage range.

As shown in FIGS. 4A to 4D, when the power supply voltage is, for example, equal to or higher than 2.1 V, a command is transmitted from the MPU to the RF communication unit 14*a* to transmit a predetermined control signal to the television receiver 1. The RF communication unit 14*a* transmits the predetermined control signal to the television receiver 1. The television receiver 1 receives the control signal and returns acknowledgement to the remote controller 10. The MPU receives the acknowledgement via the RF communication unit 14*a*. Consequently, the MPU confirms that the control signal is transmitted to the television receiver 1. The television receiver 1 that receives the control signal performs control such as channel selection and volume selection on the basis of the control signal.

On the other hand, when the power supply voltage of the remote controller 1 falls below the predetermined voltage value, the function of the RF communication unit 14*a* stops and it is difficult to perform the RF communication. Therefore, even if the MPU transmits a command, a control signal is not transmitted to the television receiver 1 and the MPU may not be able to receive acknowledgement.

As explained above, in the RF communication, a stable communication state can be kept when the power supply voltage of the remote controller 10 is equal to or higher than the predetermined voltage value. However, it suddenly becomes difficult to perform communication when the power supply voltage falls below the predetermined voltage value.

On the other hand, in the IR communication, an output level of an infrared ray gradually falls according to the fall in the power supply voltage (consumption of the battery) of the remote controller 10. It becomes difficult to transmit the infrared ray when the power supply voltage falls below the predetermined voltage value. The predetermined voltage value is set to, for example, 1.8 V. The power supply voltage at which it becomes difficult to perform the IR communication is lower than the voltage value (e.g., 2.1 V) at which it becomes difficult to perform the RF communication. In the IR communication, the output level of the infrared ray gradually falls. Therefore, a range in which the IR communication can be performed is narrowed according to the fall in the power supply voltage of the remote controller 10.

Therefore, for example, the remote control for the television receiver 1 is performed by the RF communication until the power supply voltage of the remote controller 10 falls to 2.1 V. The RF communication is automatically switched to the IR communication when the power supply voltage falls below 2.1 V. Consequently, even when the power supply voltage of the remote controller 10 falls below the predetermined voltage, it does not suddenly become difficult to perform the remote control for the television receiver 1. After the RF communication is switched to the IR communication, the range in which the IR communication can be performed is gradually narrowed until the power supply voltage falls to 1.8 V. This allows the user to intuitively recognize the fall in remaining battery power.

The power supply voltage of the remote controller 10 is detected by the MPU of the control unit 13. The MPU requests, according to a detected voltage value, the RF communication unit 14*a* or the IR communication unit 14*b* to transmit a control signal to the television receiver 1. This makes it possible to automatically switch a communication system according to the power supply voltage of the remote controller 10.

When remote control is performed only by the RF communication, it suddenly becomes difficult to perform communication when the power supply voltage falls below the predetermined voltage. Therefore, when a new battery is not prepared, the remote controller 10 is unusable until the new battery is prepared. It is difficult to perform remote control for the television receiver 1. However, when the remote controller 10 according to this embodiment is used, the output of the IR communication gradually falls and the consumption of the battery can be recognized. Therefore, a new battery can be prepared until it becomes difficult to perform communication. Further, in the IR communication, a battery capacity can be effectively used.

The IR communication may be used when the power supply voltage is equal to or higher than 2.1 V. As shown in FIG. 4A, even when the power supply voltage of the remote controller 10 falls below 1.8 V, the MPU does not stop operation and performs operation that is possible under low voltage. However, since it is difficult to perform either the RF communication or the IR communication, the remote controller 10 as a whole is inoperable.

(2) Second Embodiment

A second embodiment of the present invention is explained below. The RF communication is easily interfered with other communication as explained above. For example, when radio wave interference occurs or when a radio wave interferes, it is likely that control by a remote controller may be impossible. In the second embodiment, when the control of a controlled apparatus by the RF communication is difficult because of some cause, the remote controller automatically switches the RF communication to the IR communication and performs the control of the controlled apparatus.

A configuration of the remote controller 10 according to the second embodiment is the same as that of the remote controller 10 according to the first embodiment. Therefore, in the second embodiment, only the control of switching of the RF communication and the IR communication is explained.

Figure 5A:
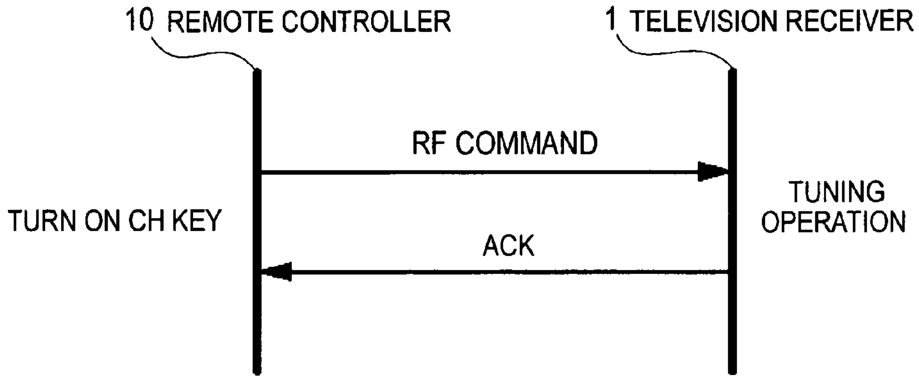
FIGS. 5A and 5B are schematic diagrams of processing performed between a remote controller and a television receiver in a second embodiment of the present invention.
Figure 5B:
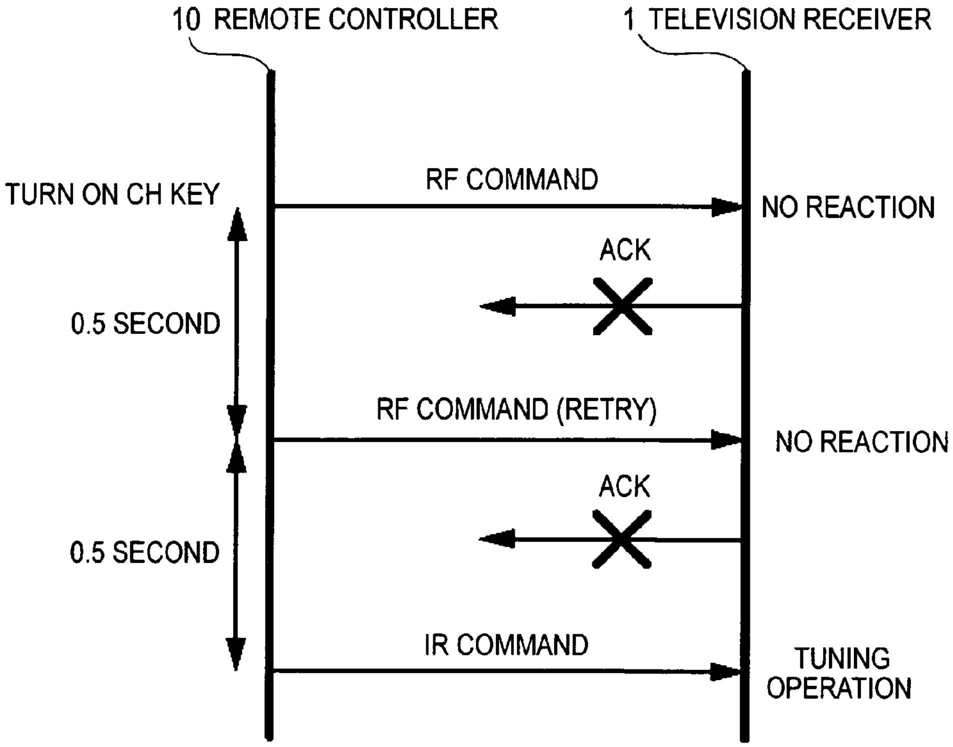

Processing shown in FIGS. 5A and 5B is performed between the television receiver 1 and the remote controller 10 that perform the RF communication.

Processing performed when the RF communication is normally performed and a channel is selected is shown in FIG. 5A. When one of channel keys is operated, an RF command including a control signal is given from the remote controller 10 side to the television receiver 1. When the RF command is transferred to the television receiver 1, the television receiver 1 forms acknowledgment on the basis of the control signal and returns the acknowledgment to the remote controller 10. In the television receiver 1, channel selection is performed on the basis of the control signal.

On the other hand, processing performed when the RF communication is not normally performed and the RF communication is switched to the IR communication is shown in FIG. 5B. When one of the channel keys is operated, an RF command including a control signal is transmitted from the remote controller 10 side to the television receiver 1. When the RF command is not received on the television receiver 1 side because of some cause, the television receiver 1 does not transmit acknowledgment and acknowledgment is not received by the remote controller 10. Therefore, the remote controller 10 transmits the RF command again (retries transmission). When acknowledgment is not returned from the television receiver 1, the RF command is automatically transmitted again by the control unit 13 after a predetermined time. The predetermined time is set to, for example, 0.5 second.

When acknowledgement from the television receiver 1 responding to the RF command transmitted by the remote controller 10 again is not received, the control unit 13 automatically transmits the IR command including the control signal to the television receiver 1 after a predetermined time. The predetermined time is set to, for example, 0.5 second. In the television receiver 1 that receives the IR command, channel selection is performed on the basis of the control signal included in the IR command.

In the RF communication, when the control signal is normally transmitted to the television receiver 1, acknowledgement is returned from the television receiver 1 to the remote controller 10. Therefore, a state of the RF communication can be determined according to presence or absence of reception of the acknowledgement in the remote controller 10. When the acknowledgement is not received in the remote controller 10, the control of the controlled apparatus can be comfortably performed by automatically switching the RF communication to the IR communication and performing the control.

In the second embodiment, the channel key is operated. However, automatic switching of the RF communication and the IR communication is performed in the same manner in control by operation of other operation keys such as volume selection by a volume adjustment key.

In this embodiment, the retransmission (retry) of the RF command is performed once. However, the retransmission may be performed plural times.

(3) Third Embodiment

A third embodiment of the present invention is explained below. When the control of a controlled apparatus is not performed regardless of the fact that an operation key of a remote controller is operated, a user may operate the same operation key again. When the control is not performed even if the operation key is operated again, it is conceivable that the user operates the operation key plural times in a short time. In the third embodiment, when such operation is performed, the remote controller determines that it is difficult to perform control according to a present communication system and automatically switch the communication system to the other communication system to perform the control of the controlled apparatus.

A configuration of the remote controller 10 according to the third embodiment is the same as the remote controller 10 according to the first embodiment. Therefore, in the third embodiment, only the control of switching of the RF communication and the IR communication is explained.

In the third embodiment, operation keys for operating + or − to perform control such as a volume adjustment key and a channel key and operation keys for which continuous operation is necessary such as a cursor four-direction key are excluded from targets of the control of switching of a communication system. Further, in some cases, for example, the user operates a ten key on a setting screen or the like to input numbers. In such a case, it is likely that continuous operation of the same operation key is necessary. Therefore, some operation keys are controlled not to perform switching of a communication system depending on a situation.

Timing of processing of IR transmission and RF transmission performed when any one of the operation keys is operated is shown in FIGS. 6 to 9. In FIGS. 6 to 9, for example, "1" of the ten key is operated. Remote control for the television receiver 1 is performed by the IR communication and the IR communication is switched to the RF communication.

(3-1) First Method

Figure 6:
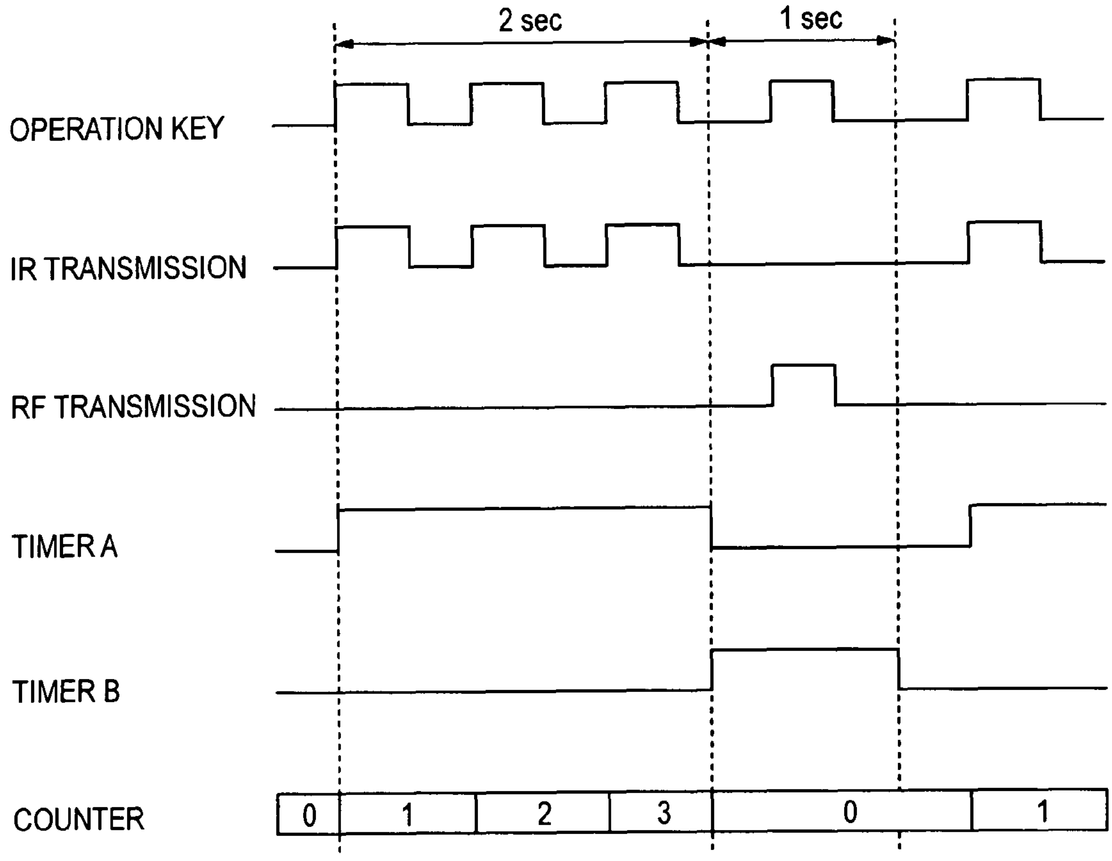
FIG. 6 is a schematic diagram of a state of processing in a third embodiment of the present invention.

A method of switching the IR communication to the RF communication when, after the same operation key is operated plural times in a predetermined time, the same operation key is operated again is shown in FIG. 6. For example, processing for switching a communication system when the same operation key is operated three times or more in two seconds and, within one second after the operation, the operation key is operated again is explained below.

First, when an operation key is depressed. A timer A starts at an instance when the operation key is depressed and counts two seconds. When the same operation key is depressed twice or more until the timer A counts two seconds, the timer A counts two seconds and stops and, at the same time, a timer B starts. When the same operation key is depressed within one second after the timer B starts, the communication system is switched from the IR communication to the RF communication and a control signal corresponding to the operated operation key is transmitted.

When the operation key is operated after the timer B counts one second and stops, control is performed in the first communication system, i.e., the IR communication.

The timer A and the timer B are incorporated in the MPU and perform count. When a certain operation key, for example, the "1" key of the ten key is depressed, a waveform indicating a state of the "1" key rises. When the depression of the "1" key is released, the waveform falls. The MPU detects a first rising edge of the "1" key, starts count of a timer, and counts, with a counter, the number of times of operation of the "1" key as "1". The MPU detects a rising edge of the "1" key and counts the number of times of operation of the "1" key with the counter only while the timer counts a predetermined time (e.g., two seconds). When the MPU detects a rising edge of the "1" key three times or more in two seconds from the start until the stop of the timer A, the MPU starts the timer B simultaneously with the stop of the timer A. The timer B counts a predetermined time (e.g., one second). When the "1" key is operated while the timer B counts one second, the MPU performs control to transmit a control signal in a communication system (in FIG. 6, the RF communication) different from the present communication system.

Figure 7:
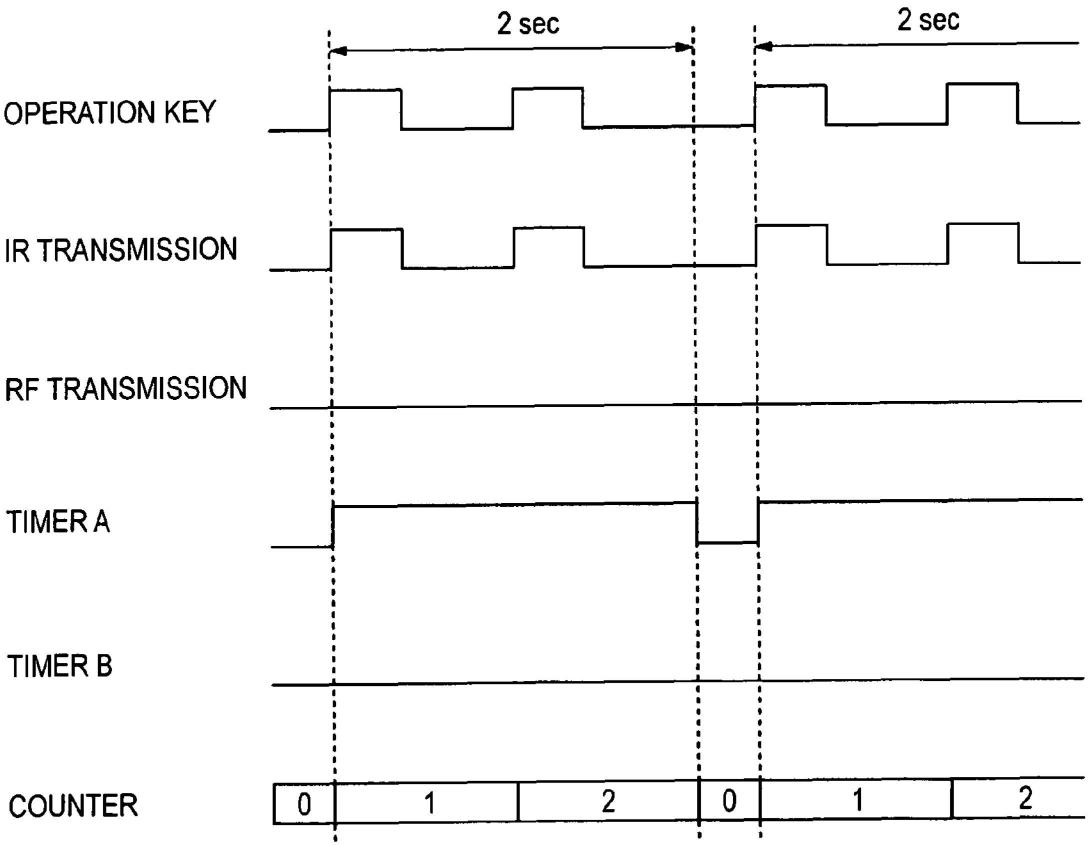
FIG. 7 is a schematic diagram of a state of processing in the third embodiment.

On the other hand, timing of processing performed when, while two seconds are counted after an operation key is operated and the timer A starts, the same operation key is not operated three times or more is shown in FIG. 7. For example, the "1" key is operated and the timer A starts count and the "1" key is operated again until the timer A counts two seconds and stops. In this case, the counter counts the number of times of operation of the "1" key as "2". Even if the timer A stops, the timer B is not started and the IR communication is maintained as the communication system. When any one of the operation keys is operated next, the timer A starts and the number of times of operation of the operation key is counted as "1" by the counter.

In the above explanation, the counter counts the number of times of operation of the "1" key. However, the counter is not limited to this. The counter can detect the number of times of operation for all the operation keys of the remote controller 10.

(3-2) Second Method

Figure 8:
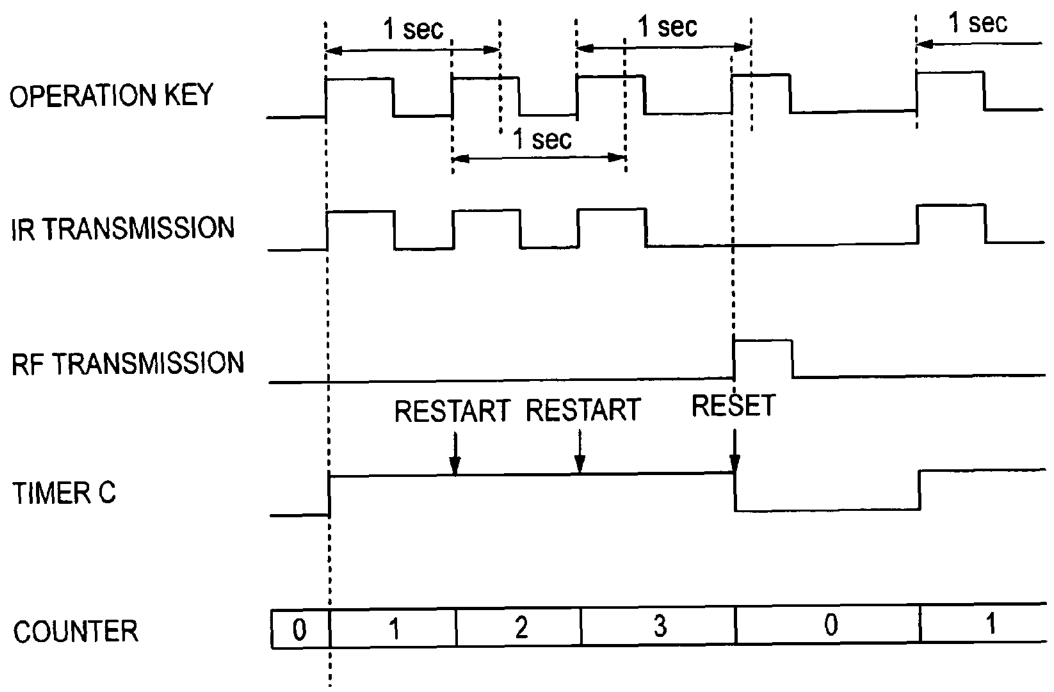
FIG. 8 is a schematic diagram of a state of processing in the third embodiment.

A method of switching the IR communication to the RF communication when the same operation key is operated plural times at a short operation interval is shown in FIG. 8. For example, processing for switching a communication system when the same operation key is operated four times within one second of an operation interval is explained below.

First, an operation key is depressed. A timer C starts at an instance when the operation key is depressed and counts time. When the same operation key is depressed again before the timer C counts one second and stops, the timer C is reset and count is started from 0 again. The counter counts the number of times of operation as "2". When the same operation key is depressed for the third time until the timer C counts one second again, the timer C is reset again and count is started from 0 again. The counter counts the number of times of operation as "3".

When the same operation key is depressed for the fourth time until the timer C counts one second again, the MPU switches the IR communication to the RF communication and transmits a control signal. When the same operation key is depressed for the fourth time, the timer C is reset and stops. The number of times of operation is reset to "0" in the counter.

When any one of the operation keys is operated next, the timer C starts and the counter counts the number of times of operation of the operation key. The communication system is reset to the IR communication and a control signal is transmitted.

Figure 9:
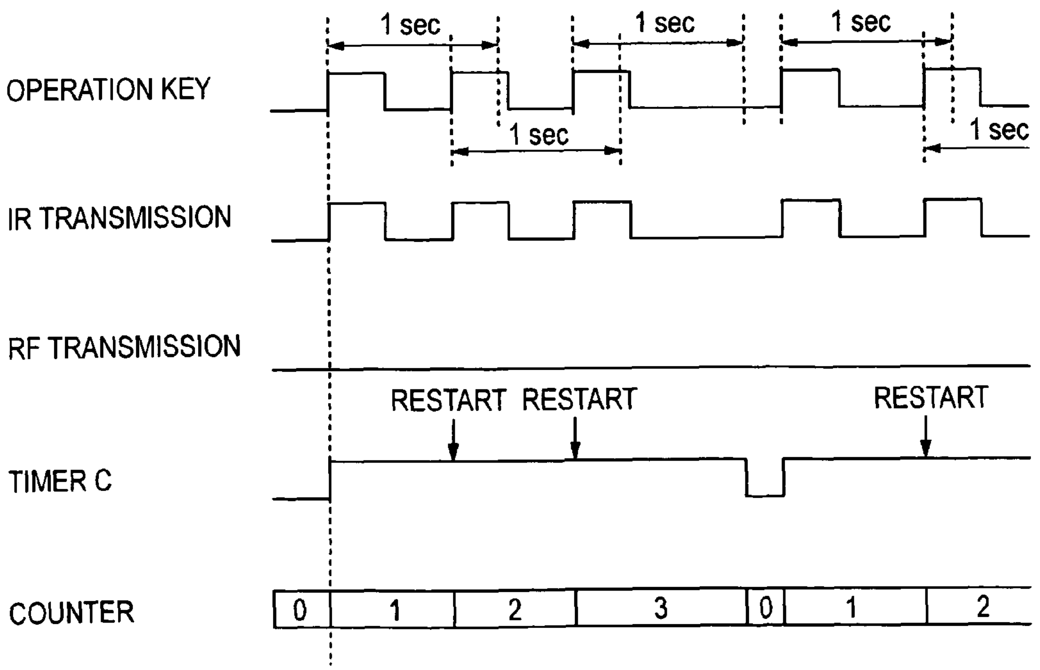
FIG. 9 is a schematic diagram of a state of processing in the third embodiment.

On the other hand, for example, as shown in FIG. 9, when the same operation key is not operated four times at a short interval equal to or shorter than one second, the communication system is not switched. Even when the same operation key is continuously operated, when an operation interval exceeds one second, the timer C stops and the number of times of operation of the operation key counted by the counter is reset to "0". When any one of the operation keys is operated next, the timer C starts and the counter counts the number of times of operation of the operation key as "1".

The number of times of operation of the operation key counted by the counter is actually, for example, a binary number of two digits. When the number of times of operation is "0", "1", "2", and "3", the number of times of operation is actually represented as "00", "01", "10", and "11". The number of times of operation is not limited to two digits. A necessary number of digits is selected according to the number of times of operation performed until the communication system is switched.

In the first method in the third embodiment, within the predetermined time after an operation key is operated, when the same operation key is operated the predetermined number of times, the communication system is automatically switched to transmit a control signal. In the second method, when the same operation key is operated the predetermined number of times at a short operation interval, the communication system is automatically switched to transmit a control signal. Consequently, even when it becomes difficult to perform a present communication system because of some cause, it is possible to automatically switch the communication system to the other communication system and control the controlled apparatus and comfortably perform the control of the controlled apparatus.

In the third embodiment, the method of switching the IR communication to the RF communication when control is performed in the IR communication is explained. However, the RF communication may be switched to the IR communication when control is performed in the RF communication and it is difficult to perform the control.

As explained above, in the first to third embodiments, the remote controller 10 that can automatically switch the IR communication and the RF communication according to a situation is explained. However, the first to third embodiments can be combined.

For example, in the first embodiment, the control of the controlled apparatus is performed by the RF communication when the power supply voltage of the remote controller 10 is equal to or higher than 2.1 V. In this case, by combining the second or third embodiment with the first embodiment, it is possible to automatically change the communication system to the IR communication and perform the control of the controlled apparatus when it becomes difficult to perform control by the RF communication. After the control is performed by the IR communication until the power supply voltage of the remote controller 10 falls below 2.1 V, the IR communication is automatically reset to the RF communication.

In this way, one controlled apparatus can be controlled by the plural communication systems and the communication systems are automatically switched by the remote controller. Therefore, even when it becomes difficult to perform control with any one of the communication system, it is possible to perform control with another communication system.

The first to third embodiments of the present invention have been specifically explained. However, the present invention is not limited to the embodiments. Various modifications based on the technical idea of the present invention are possible. For example, the numerical values described in the embodiments are merely examples. Numerical values different from these numerical values may be used when necessary.

For example, a recorder such as a blu-ray disk recorder as an external AV apparatus may be connected to the television receiver 1 to control the television receiver 1 and the recorder with the remote controller 10. When the recorder can perform both the RF communication and the IR communication, it is possible to control the communication system according to a method same as the control in the first to third embodiments. When both the television receiver 1 and the recorder are controlled, common operation keys for controlling the television receiver 1 and the recorder and dedicated operation keys solely for the apparatuses are included in the operation unit 10*a*. In this case, an apparatus selection button is provided in the remote controller 10 and the user selects the apparatus that the user desires to operate.

It should be understood by those skilled in the art that various modifications, combinations, sub-combinations and alterations may occur depending on design requirements and other factors insofar as they are within the scope of the appended claims or the equivalents thereof.

What is claimed is:

1. A remote controller comprising:

an operation unit including plural operation keys;

a radio communication unit that performs bidirectional radio frequency (RF) communication with a controlled apparatus;

an infrared communication unit that performs unidirectional infrared (IR) communication with the controlled apparatus; and a control unit that is input with an operation signal from the operation unit and controls the radio communication unit and the infrared communication unit, wherein the control unit includes a measuring unit that measures power supply voltage, the control unit controls the radio communication unit to transmit a control signal to the controlled apparatus by way of RF communication when the power supply voltage is equal to or higher than a predetermined value and controls the infrared communication unit to transmit the control signal to the controlled apparatus by way of IR communication when the power supply voltage is lower than the predetermined value such that the control unit automatically switches control of the radio communication unit to the infrared communication unit so as to cause the infrared communication unit to transmit the control signal to the controlled apparatus when the measured power supply voltage changes from a first value which is equal to or higher than the predetermined value to a second value which is lower than the predetermined value, and the control unit controls the radio communication unit and the infrared communication unit to transmit the control signal to the controlled apparatus by way of the other of RF communication or IR communication which is currently being used when a same operation key of the operation unit is operated a first predetermined number of times within a first predetermined time period and the same operation key thereafter is operated a second predetermined number of times within a second predetermined time period, wherein the first predetermined number is two or more, wherein the second predetermined number is one or more, and wherein the second predetermined time period immediately follows the first predetermined time period.

2. A remote controller according to claim 1, wherein the control unit controls the infrared communication unit to transmit the control signal to the controlled apparatus when the power supply voltage is equal to or higher than the predetermined value and the control unit determines that remote control via the radio communication unit cannot be performed.

3. A remote controller according to claim 1, further comprising a light unit which emits a first color light during the RF communication when the control unit controls the radio communication unit to transmit the control signal and emits a second color light during the IR communication when the control unit controls the infrared communication unit to transmit the control signal, in which the first color light is different than the second color light, so as to provide an indication to a user of the remote controller as to which of the RF communication or the IR communication is currently being utilized.

4. A remote controller according to claim 3, wherein the first color light is blue light and the second color light is red light.

5. A remote controller according to claim 1, wherein even when the power supply voltage is equal to or higher than the predetermined value, the control unit automatically controls the infrared communication unit to transmit the control signal to the controlled apparatus by way of IR communication when the control unit determines that remote control via the radio communication unit cannot be performed.

6. A remote controller according to claim 1, wherein the predetermined value is approximately 2.1 V.

7. The remote controller according to claim 1, in which the first predetermined time period is different from the second predetermined time period.

8. The remote controller according to claim 7, in which the first predetermined number of times is three, the first predetermined time period is two seconds, the second predetermined number of times is one, and the second predetermined time period is one second.

* * * * *